April 4, 1961 G. W. GILES 2,977,743
ROTARY WHEEL RAKING DEVICE
Original Filed Nov. 6, 1950 4 Sheets-Sheet 3
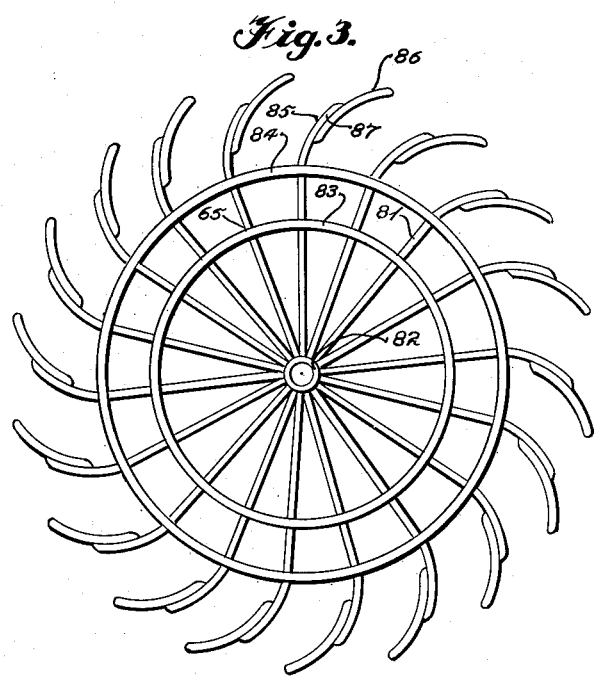
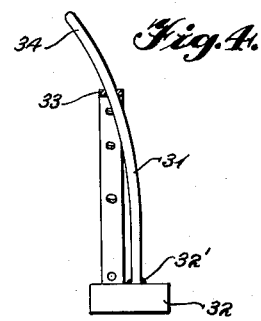
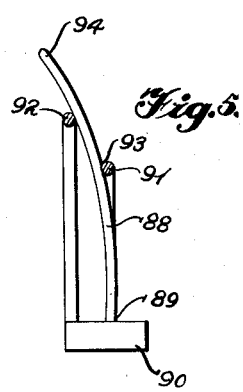
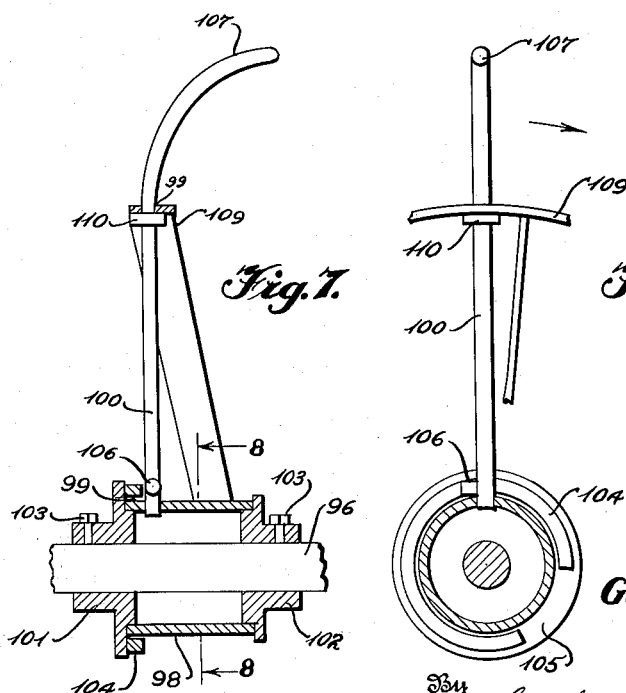
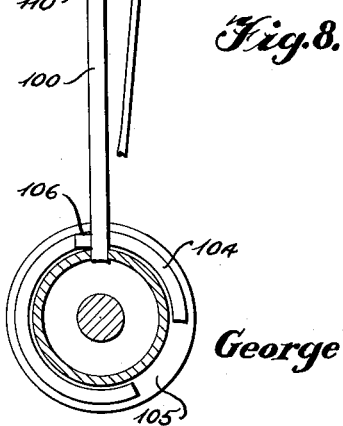
Inventor
George W. Giles, April 4, 1961 G. W. GILES 2,977,743
ROTARY WHEEL RAKING DEVICE
Original Filed Nov. 6, 1950 4 Sheets-Sheet 4
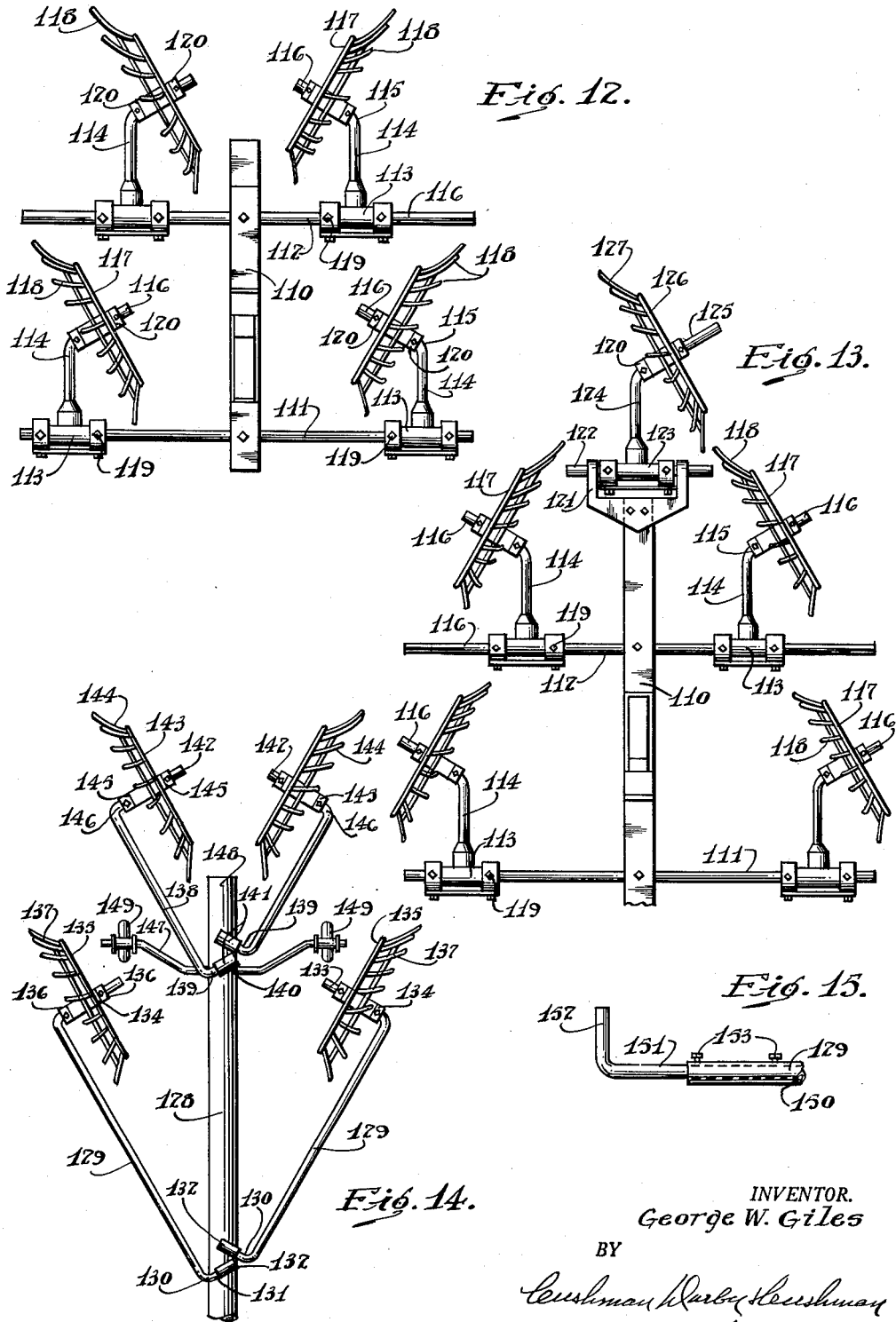
INVENTOR.
George W. Giles
BY
Cushman Darby Cushman
ATTORNEYS United States Patent Office 2,977,743
Patented Apr. 4, 1961

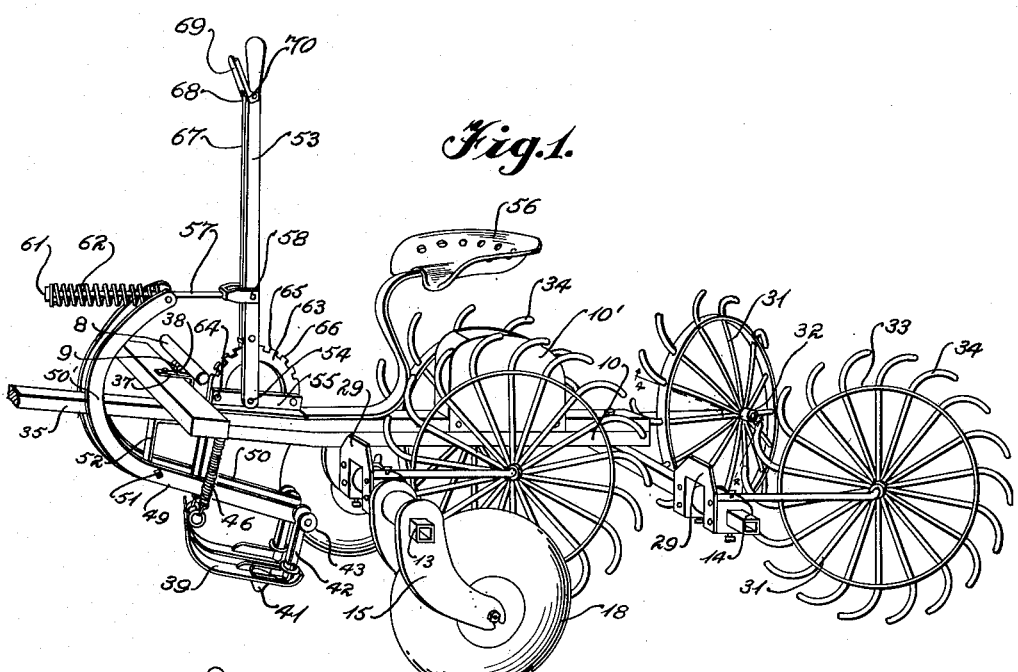
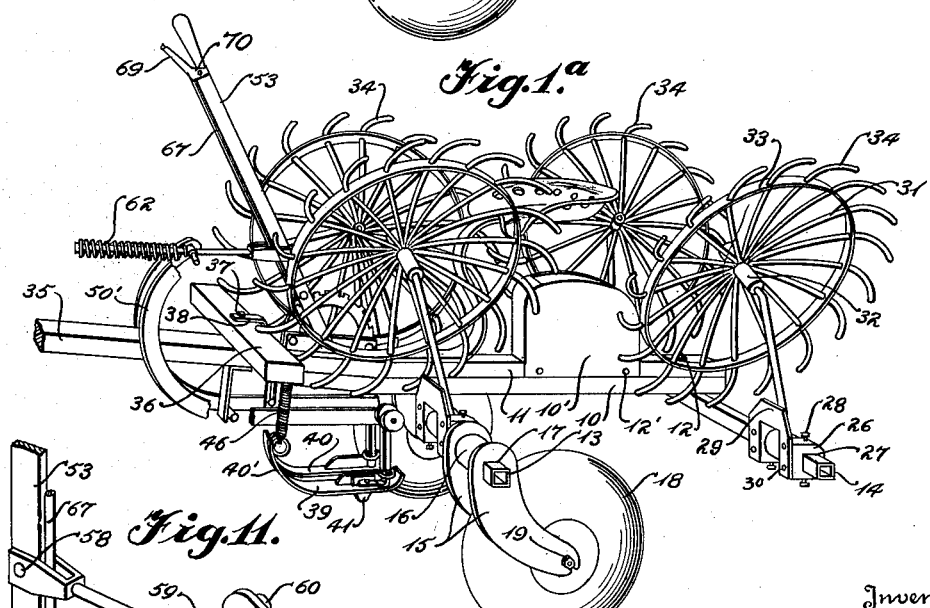

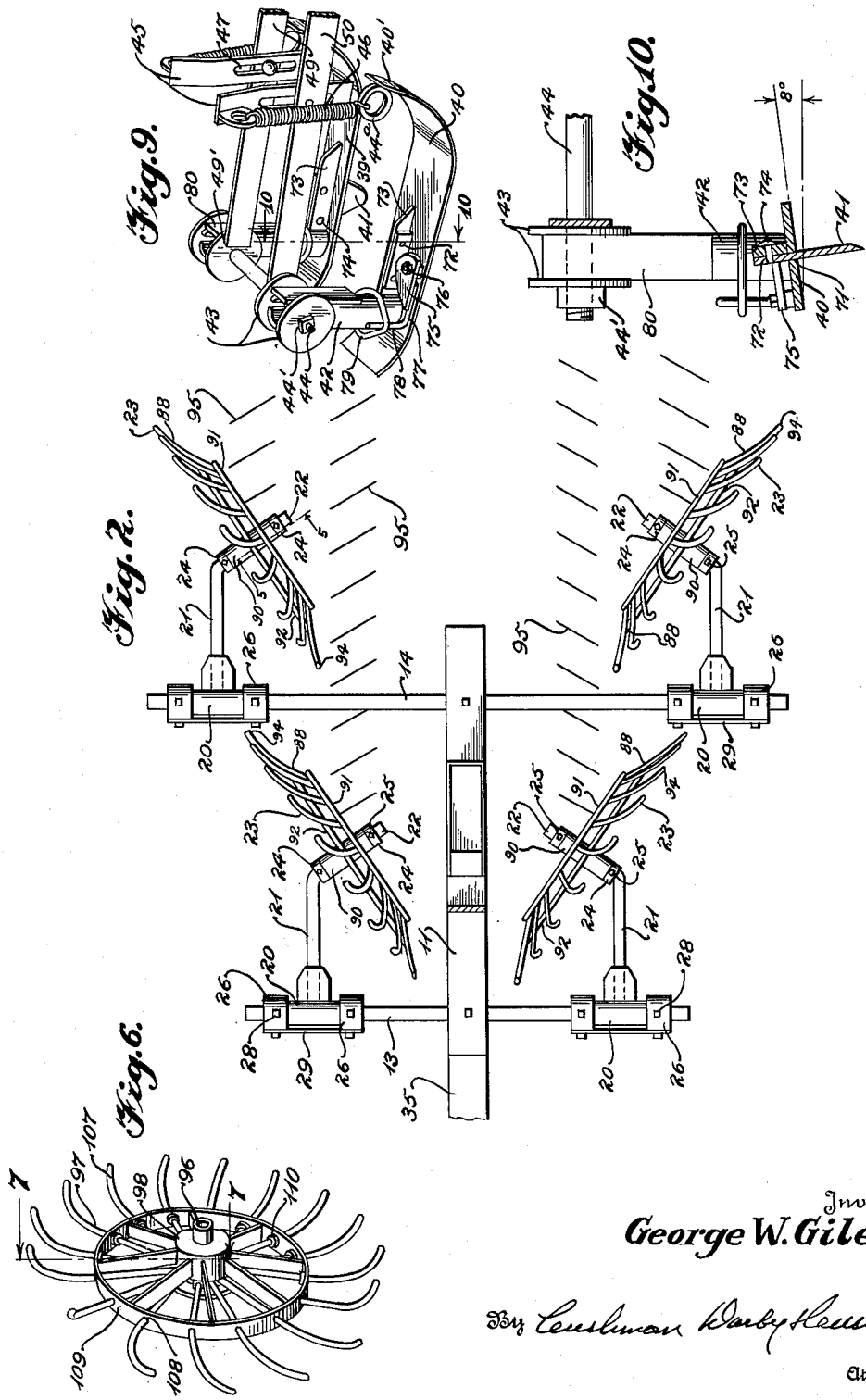

2,977,743

ROTARY WHEEL RAKING DEVICE

George W. Giles, Raleigh, N.C., assignor to Daffin Corporation, a corporation of Delaware Continuation of application Ser. No. 194,222, Nov. 6, 1950. This application Mar. 10, 1959, Ser. No. 808,544

55 Claims. (Cl. 56—377)

The present invention relates to an improved harvester or windrowing machine for collecting and depositing in longitudinal rows sweet potato vines, and for tedding or windrowing cut material that lies in swath for curing, such as hay or the like. This application is a continuation of my application Serial No. 194,222, now abandoned, filed November 6, 1950, which is a continuation-in-part of my earlier application Serial No. 747,895, filed May 14, 1947, also now abandoned.

An important object of the invention consists in providing a windrowing machine with simple, efficient and economical means for facilitating the harvesting of sweet potato vines, hay or the like. The machine is arranged to straddle a hilled row of potatoes and has spaced knives for cutting the vines loose from the tubers on each side of the center of the row. In order to move the vines into a windrow in the valley between two hilled rows, concave spoked wheels are provided and the spokes constitute fingers which are shaped and designed to slide under the vines and move them into a windrow between two hilled rows without moving the soil. The concave spoked wheels are revolubly mounted on axles and are disposed at an angle to the forward direction of the machine. The outer ends of the fingers are curved rearwardly and the center pull is located so as not to cause the points of the fingers to penetrate the soil and cause possible damage to the tubers. The shape of the fingers also facilitates the shedding of the vines from the wheel as the fingers are raised upwardly from the ground during the operation of the harvester.

A further object consists in providing a spoked wheel for collecting the vines, in which the spokes constitute movable fingers having ends compoundly curved circumferentially and axially of the wheel. Operatively associated with each of the fingers is a fixed cam means for rotating the fingers substantially 90° as they lift the vines from the soil, so as to insure proper shedding of the vines from the wheel.

A further object consists in providing an agricultural machine having a mobile frame with one or more rotary raking members in the form of a wheel, disc or the like. Each of the raking elements is separably connected to the frame by pivotal or movable means which insures the same gravitationally conforming to the terrain traversed.

A further object consists in providing each of the rotary raking elements with radially disposed tines that are inclined forwardly with respect to the direction of earth traversing motion and rearwardly relative to the direction of rotation of the raking element.

Another object is to provide an agricultural machine having a mobile frame to which is connected a plurality of raking elements that are adjustable relative to the frame and to each other so as to permit the single structure to be used for windrowing by arranging the raking elements so that the material displaced laterally by the foremost raking element is continued on its path of conveyance by the cooperating rearwardly adjacent raking elements. The machine is used for tedding by arranging the raking elements so as to permit them each to direct their material uncooperatively in separate paths.

Another object is to provide a means for displacing windrows, formed by two echelons of cooperating raking elements, laterally, so as to cause the windrows to rest on a previously raked area.

Other objects and advantages of the invention will become apparent from the following description when taken in conjunction with the accompanying claims and drawings.

Referring to the drawing wherein are shown for illustrative purposes several embodiments the invention may assume:

Figure 1 is a perspective view of a harvester constructed in accordance with the present invention, and showing finger wheels thereof in their operative position.

Figure 1a is a view similar to Figure 1 with the finger wheels moved to their inoperative position.

Figure 2 is a plan view of the harvester of Figure 1 but with a second form of the finger wheels being substituted for those shown in Figure 1 and with portions of the harvester being removed for illustrative convenience.

Figure 3 is an enlarged side view showing the second form of finger wheel as further modified.

Figure 4 is an enlarged section taken on line 4—4 of Figure 1.

Figure 5 is an enlarged section taken on line 5—5 of Figure 2.

Figure 6 is a perspective view of a further form of wheel.

Figure 7 is an enlarged section taken on line 7—7 of Figure 6.

Figure 8 is a section taken on line 8—8 of Figure 7.

Figure 9 is an enlarged detail perspective view of cutting members associated with the harvester.

Figure 10 is a section taken on line 10—10 of Figure 9.

Figure 11 is an enlarged detail of the coupling means, with parts broken away, for adjustably mounting the cutting members.

Figure 12 is a plan view of a modified form of the invention.

Figure 13 is a plan view of a further modified form.

Figure 14 is a plan view of a further modification, and

Figure 15 shows a detail of a modified form of adjustable supporting arm for carrying a raking member.

Referring to the drawings in which like numerals indicate like parts in the several views, 10 designates a centrally disposed elongated beam or supporting member, to which is connected a draft bar 11 by the bolts 12. Extending transversely of the beam, and preferably of different lengths are spaced supporting members or shafts 13 and 14 which are hollow and of substantially square shape in cross-section. To the ends of the shaft 13 are attached wheel-supporting means, each of which comprise a pair of spaced arms 15 which are connected at their upper ends by a transverse tubular sleeve 16 (Fig. 1a). The arms 15 are provided with openings 17 corresponding in shape to the shaft 13 so as to be keyed or non-rotatably connected thereto. A ground-engaging wheel 18 is revolubly mounted on an axle 19, which is suitably connected to the lower ends of each of the arms 15.

A tubular sleeve 20 is slidably mounted on each of the shafts 13 and 14 on each side of the harvester. Said sleeves are of larger diameter than the cross sectional area of the transverse shaft so as to be freely rotatable thereon. Extending outwardly and rearwardly from the sleeve 20 is a rod or arm 21, which is bent inwardly to form a stub axle 22 on which is rotatably mounted a concave spoke wheel 23 (Fig. 2). Spaced locking collars 24 serve to retain the wheel 23 on its axle 22 and are secured in place by set screws 25. Each of the sleeves 20 is slidable longitudinally on its transverse supporting shaft, and is retained in any suitable adjusted position by the spaced locking collars 26 which engage opposite sides of the sleeve 20 and are provided with square openings 27 (Fig. 1a) through which extend the end portions of the adjacent transverse supporting shaft. The collars 26 are held in adjusted position by set screws 28. An inverted U-shaped bracket 29 is secured as at 30 to the sides of the collars 26, and provides means for connecting these collars so that they may be simultaneously moved longitudinally on the transverse supporting shaft to adjust laterally the position of the front and rear pair of spoked wheels 23. It will be noted that the stub axles 22 for the concave wheels 23 are disposed at an abtuse angle to the forward direction of the harvester and are readily adjusted to vary the width between the wheels as working conditions require. Moreover, as the sleeves 20 are freely rotatable on their respective supporting shafts, they provide floating means for allowing the concave finger wheels 23 to move over the ground and accommodate themselves to any unevenness over which the harvester travels. When not in use, the wheels 23 may be swung from the positions shown in Figure 1 to inoperative positions, as shown in Figure 1a, and the bracket member 29 then constitutes means for limiting the forward swinging movement of the arms 21 and the wheels 23.

The spokes of the concave wheels 23 are longitudinally curved to constitute flexible fingers that extend radially from the hub 32 (Fig. 4) and through circumferentially disposed openings in an annular member or rim 33, and have their outer ends curved or bent rearwardly as at 34. The inner ends of the fingers 31 are connected to the hub 32 as at 32' by soldering, welding, or the like. The offset arrangement of the longitudinally curved fingers 31 with the hub 32 imparts a concave shape to each wheel, the outer ends of the fingers being disposed in a plane and the inner ends of the fingers being disposed in a substantially parallel plane spaced axially of the hub from the plane of the outer ends.

The draft bar 11 extends forwardly of the harvester, as at 35, so as to be connected to a single-tree 36 or the like through the strap 37 and bolt 38. Obviously, the harvester may be motivated in earth traversing movement by motor power, such as a tractor or the like. A pair of spaced flat skids 39 and 40 having knives 41 for cutting the vines loose from the tubers are positioned in front of the wheels 18. The knives 41 are in the form of mower blade sections. Each skid has extending upwardly from the rear end thereof a tubular member 42 (Fig. 9) that extends between a pair of spaced discs 43 and is pivotally connected to a transverse threaded bolt 44, that is retained in position by the nut 44'. The forward ends of the skids are curved upwardly, as at 40' and have loops 44a connected to straps 45 through the coil springs 46. Each of the straps 45 has an elongated slot 47 so as to be adjustably connected to one of an adjacent pair of longitudinal bars 49 and 50 of a supporting member. The bars 49 and 50 are positioned below the beam 10 and extend forwardly of the harvester, and are pivoted as at 51 (Fig. 1) to a bracket 52 extending downwardly from the draft bar at its forward end 35. The arms 49 and 50 are welded or otherwise connected at their rear ends as at 49' to adjacent inner discs 43 and are curved upwardly and rearwardly at their forward ends, as at 50' and are disposed on opposite sides of the draft bar 11. An operating lever 53 is pivoted as at 54 to an angle bar 55 secured to the draft bar 11 in front of and adjacent to the driver's seat 56. A footrest 8 is connected to the strap 37, as at 9. A rod 57 is pivotally connected, as at 58, to an intermediate portion of the lever 53 and loosely extends through a coupling member 59, which in turn is connected to transverse aligned shafts 60 (Fig. 11) that are pivotally mounted in the upper ends of the supporting members 49 and 50. The outer end of the rod 57 is threaded to receive a nut 61, and between this nut and the coupling 59 is confined a coil spring 62. A quadrant 63 connected as at 64 to the angle bar 55, has a segmental tooth portion 65 arranged to receive a locking pawl 66 carried by the lower end of a movable rod 67 that is connected at its upper end, as at 68, to a handle 69 pivoted at 70 to the lever 53.

It will be seen that rearward movement of the lever 53 from its normal operative position shown in Figure 1 causes the rod 57 also to be moved rearwardly thus tensioning the spring 62 and that the parts are releasably maintained in this position by engagement of the pawl 66 with one of the teeth 63 of the quadrant. Simultaneously, the knives 41 are further embedded in the ground due to the downward swinging movement imparted to the longitudinal bars 49 and 50 which are swung about their pivot 51 by the operative connection of the supporting member to the lever 53 through the rod 57. The adjustable tension of the spring 62 under the control of the lever 53 permits the knives 41 to move along uneven soil and yet to be held firmly against the ground under pressure. The skids 39 and 40 are likewise caused to move over the top of the ground and maintain the knives 41 at a uniform depth. The spring 62 coacts with the springs 46 for providing yieldable means for maintaining the skids 39 and 40 in their proper operative position irrespective of the unevenness of the ground over which the harvester or windrowing machine is operating.

The bottom of each of the skids 39 and 40 is preferably formed with an elongated longitudinally extending central opening 71 (Fig. 10) through which extends the knife 41 to permit the upper portion 72 of the knife to be detachably connected to a flange or lug 73 on the skid by the removable bolts 74. Pivoted on the upper surface of each of the skids is a rotatable cam 75, as at 76, which is arranged to bear against the side of the upper portion 72 of the blade 41. A rod or member 77 is suitably connected at one end to the underside of the cam 75, such as by soldering or the like, and is bent to form a vertical portion or arm 78 extending adjacent to and parallel with the tubular member 42 so as to provide an operating handle for moving the cam 75 into and out of clamping engagement with the adjacent portion 72 of the knife 41 so as to assist in firmly maintaining the blade in its operative position. A locking ring 79 is slidable on the tubular member 42 and is arranged to be moved down to engage the handle portion 78 of the rod 77 so as to retain the same in a fixed position. It will be seen that upon releasing the ring 79 from engagement with the handle portion 78 of the rod 77, that the latter may be swung outwardly so as to cause the cam 75 to be moved about its pivot 76 and away from locking engagement with the portion 72 of the blade 41. Welded or otherwise connected to each of the tubular members 42 and extending upwardly therefrom between the discs 43 is a strap or bar 80 that serves to center the skid during its pivotal movement on the rods 44.

In Figure 1, the operating lever 53 has been moved so as to position the knives 41 in their operative position. It will be seen that when the lever 53 is moved rearwardly towards the operator, the spring 62 is subjected to tension and the knives penetrate the ground so as to cut the vines. The spring 62 provides yieldable means for allowing the knives to float along uneven soil and yet to be held firmly against the soil under pressure. The springs 46 which are adjustably connected to the straps 45 permit the skids 39 and 40 to rotate slightly on the shaft 44 so that when the knife sections become clogged with grass or weeds, this limited rotation or movement acts to discharge the material collected on the skids. The knives 41 are detachably connected to the skids for convenience of removal for sharpening or replacing. It will be seen that the yieldable adjustable connection of the skids to the harvester provides means for maintaining the knives 41 at a uniform depth and that the springs 46 co-act with the springs 62 to hold these skids firmly to the ground but allows sufficient freedom of movement as to cause the skids automatically to accommodate themselves to any unevenness in the soil over which the harvester passes. The lever 53 is used for adjusting the knives 41 for operation in sweet potato beds of varying heights and for controlling the pressure of the springs 46 and 62 that serve yieldably to maintain the skids on the ground. The tension of the springs 46 is variable by adjustment of the straps 45.

In the modification shown in Figure 3, the concave wheel is formed with longitudinally curved flexible fingers or spokes 81 which are suitably connected at their inner ends to the hub 82 of the wheel at points longitudinally offset relative to the center of the hub and extend through circumferentially spaced openings in an annular member or rim 83 and also through an annular member 84 that encloses and is spaced from the annular member 83. The outer ends of the fingers 81 are curved or bent rearwardly, as at 85, and preferably are provided with curved tip portions or extensions 86 which are welded or otherwise secured to the outer curved ends 85, as at 87. The tip portions 86 are made of harder or more durable metal than the fingers 81 so as to be capable of withstanding the wearing contact, devices of this character are normally subjected to in operation.

In the modification shown in Figures 2 and 5, the flexible longitudinally curved fingers or spokes 88 are welded at their lower ends, as at 89, to the hub 90 of the finger wheel so as to be offset relative to the longitudinal center of the hub and are maintained in proper operative position by spaced rings 91 and 92 positioned on opposite sides of the fingers 88 and welded thereto as at 93. The ring 91 is of smaller diameter than the ring 92 and co-acts therewith to insure that the outer rearwardly curved portions 94 of the fingers are maintained in their proper operative positions. In all forms of the invention the fingers or spokes of the concave wheel are shaped and designed to cause the point of each finger to slide under the vines and lift them without disturbing the soil. It has been found that the use of a convex finger or a straight finger does not efficiently accomplish the same desired results and that the curvature of the fingers backwards from their direction of rotation and in the plane of the wheels, causes the fingers to shed the vines soon after they pass out of contact with the ground during the operation of the harvester. The fingers 31, 81 and 88 of the concave wheels are optionally coated with a suitable hard facing material to prevent erosion and resist attack due to changeable weather or climatic conditions.

In operation the harvester straddles one hilled row of sweet potatoes and is moved along the row by any suitable means. The knives 41 are moved and maintained in proper cutting position by the actuation of the lever 53 and the locking of the lever to the quadrant 63. This accurate control of the knives prevents injury to the potatoes during the vine cutting operation. The concave spoked wheels, it will be noted, are set at an angle to the direction of travel of the machine and the front set of wheels are positioned closer to the beam 10 in order to be laterally offset relative to the rear set, so that the fingers of the wheels remove the vines where they are rooted down and move them outward into windrows on opposite sides of the harvester. Each of the concave spoked wheels is rotatably mounted on a stub axle so as to be independent of the other wheels and provides a floating connection which automatically allows the wheels to accommodate themselves to variable bed heights and irregularities in the ground over which the harvester travels. Each of the wheels is light in weight and the center of pull is so located as not to cause the pointed curved end portions to penetrate the soil and to cause damage to the tubers. A tool box 10' is optionally connected to the draft bar 11 by the bolts 12' (Fig. 1a).

In Figure 2, the paths and points of contact of the curved end portions 94 of the fingers 88 relative to the ground, are indicated by the diagonal lines 95. It will be noted that these contact lines 95 are substantially parallel with the axles 22, on which the wheels revolve and are diagonal or oblique to the direction of travel of the harvester. The length of the diagonal line 95 indicates the drag stroke of each finger of the wheel as it contacts the ground, and of course, during this contact, the forward velocity of the wheel is slower than the velocity of the rotation of the wheel of the harvester. It is during the drag stroke that each finger lifts the vines where they are rooted in the soil and moves them at an angle to the direction of travel so that the vines may be piled in windrows on the sides of the harvester. The concavity of the flexible spoked or fingered wheels functions to cause the curved fingers to slide under the vines and the rearward curve of the fingers facilitates the shedding or removal of the vines from the fingers as the latter are raised from the ground, and provides a substantial improvement over the use of convex fingers or straight fingers. As each finger 31 is curved backward, as at 34, from its direction of rotation and substantially in the plane of the wheel, it sheds the vines soon after the fingers complete their drag stroke. Moreover, the front and rear sets of wheels are offset or positioned relative to one another so that the vines as they are shed from the wheels are moved into a windrow or pile in the valley between the two hilled rows. As the wheels 23 have a floating connection with the machine they automatically fit themselves to variable bed heights of vines that are encountered during the operation of the machine. Moreover, the assembled structure constitutes a minimum number of parts that requires very few adjustments to insure efficient operation.

While the concave spoked finger wheels are shown connected to the harvester so as to move the vines outwardly and away from the machine, it will be manifest that the wheels can be interchanged and the concave portion of the wheel instead of extending outwardly may be positioned inwardly in order to cause the fingers to move the vines inwardly into a single windrow substantially centrally of the machine. The length of the spokes or fingers 31 are uniform but if desired, the curved fingers can be alternatively of different lengths.

When it is desired to transfer the harvester from one field to another the concave spoked wheels are moved to their inoperative positions and out of contact with the ground, by swinging the arms or rods 21 upwardly so as to rotate the sleeve 20 in order to move the wheels and their associated parts from the position, as shown in Figure 1, to that shown in Figure 1a. Forward movement of the wheels is limited by reason of the contact of the rods 21 with the bracket member 29.

In the modifications shown in Figures 6, 7, and 8, each of the wheels 97 comprises a hub 98 (Fig. 7) having circumferentially spaced openings 99 into which loosely extend the lower ends of the spoke fingers 100 so as to be rotatably mounted therein. Spaced collars 101 and 102 are positioned on opposite sides of the wheel and are locked to the dead axle 96 by the set screws 103 to maintain the wheel in a fixed position on the axle. One of the collars, such as the collar 101, has secured to the inner side thereof a fixed curved cam 104 which is provided with an interrupted portion or space 105 (Fig. 8). Each of the fingers 100 adjacent its lower end has a laterally extending lug or cam follower 106 arranged to engage the adjacent surface of the cam 104 during the major portion of the rotation of the finger through a complete revolution, and drops into the space 105 at a predetermined point during the rotation of the wheel. The outer curved end portions 107 of the fingers 100 are normally set in individual planes radial of the wheel axis and oblique thereto, and the interrupted portion 105 of the cam is so located that soon after each finger is raised from the ground or at the end of the drag stroke, the finger is rotated through substantially 90° in order to loosen and shed the vines from the fingers.

The fingers 100 extend loosely through circumferentially spaced openings 108 in a rim or annular member 109 so as to be rotatable relative to the rim, and are provided with collars or lugs 110 that engage the underside of the rim to limit outward radial movement of the fingers. It will be seen that by reason of this arrangement, as the wheel rotates in the direction of the arrow (Fig. 8) the spokes or fingers 100 are periodically rotated. The fingers are curved and set in the exact direction of the relative path of the curved ends 107 of the fingers, to insure more completely removal of the vines without danger of their being wrapped around the fingers. Moreover, the wheel can be set more abruptly with the direction of travel so as to cover a greater ground area.

In the modification shown in Figure 12, the machine includes a mobile frame shown in the form of a longitudinally disposed supporting beam 110 which has connected thereto the spaced transverse bars or shafts 111 and 112 of substantially the same length, and to which the ground-engaging wheels, such as 18, previously described, may be suitably connected. Tubular sleeves 113 are slidably and adjustably connected to the front shaft 111 and the rear shaft 112, and each of these sleeves carries a rearwardly extending arm or lever 114 which is bent inwardly at 115 to form a stub axle 116 on which is rotatably mounted a raking element such as a wheel or disc 117. Each of the raking wheels preferably includes tines or fingers 118 that extend radially and forwardly from the vertical plane of the wheel 117, so as to impart a rolling, lifting action to the material. These tines have their free ends inclined or curved rearwardly or in a trailing direction with respect to the direction of rotation of the raking wheel 117 to facilitate the discharge of the conveyed material. Each of the sleeves 113 and its associated parts can be adjusted axially on its supporting bar to vary the width between opposed pairs of raking wheels or to vary the echelon arrangement of the forward raking wheel from one or more of the rear raking wheels. Adjusting screws 119 carried by the sleeves 113 are arranged to engage the bars 111 and 112 for maintaining the wheels laterally in any predetermined adjusted position. Spaced locking collars 120 on the stub axles 116 serve to retain each of the wheels 117 on its axle. The raking wheels are preferably of the same size and shape and can be readily interchangeable or reversed so as to face either inward or outward relative to the frame. This form of the machine is efficiently used for tedding material and when performing such an operation, the raking wheels 117 on the front shaft 111 are spaced further apart than the raking wheels on the rear shaft 112, and are sufficiently laterally offset from their adjacent rear wheels that during the operation of the machine, the hay or material that rests in front of each wheel is raked and discharged laterally into a separate row or onto a section of the ground that has been raked by a forward adjacent wheel, and in such a manner that the material, instead of being transferred laterally into the path of an adjacent pile or windrow, forms a separate row. Thus, it will be seen that simple, efficient and positive means are provided for lifting the mowed material from the stubble and depositing it on top of the stubble in an area that has just been raked so as to assist in drying of the material by aeration.

In the modification shown in Figure 13, the mobile frame 110 and the front and rear transverse bars 111 and 112 are substantially similar to the frame structure shown in Figure 12. The sleeves 113 are adjustably mounted on the arms so as to be movable laterally toward or away from the center beam 110 and the arms 114 are bent as at 115 to form the axles 116 which extend outwardly as contrasted to extending inwardly, as disclosed in Figure 12. The raking elements or wheel 117 are revolubly mounted on the axis 116 so that the curved tines 118 face inwardly instead of outwardly as shown in Figure 12. The set screws 119 insure that the sleeves 113 and their associated wheels are positioned in proper echelon arrangement and spaced the desired width from each other. The rear end of the beam 110 has a bifurcated coupling member 121 to which is connected a transverse pin 122. A sleeve 123 is rotatably mounted on the pin 122 which carries a rearwardly extending arm 124. The outer end of the arm 124 is bent laterally and outwardly to provide an inclined axle 125 on which is rotatably mounted a raking wheel or member 126 having tines or fingers 127 extending radially therefrom and which are similar in size and shape to the tines 118 previously described. The axle 125 is of such a length as to permit the axial adjustment of the wheel 126 so as to vary the echelon arrangement thereof relative to the adjacent raking wheel 117. The wheel 126 is positioned so as to be in the path of movement of the windrows formed by the associated echelon of wheels 117. It will be seen that by this novel arrangement of parts, the raking elements which are shown arranged in transverse pairs and in echelon, permit the raking of a wide area in which the material or hay is collected into adjacent windrows at points in front of the wheel 126, and is then formed by the wheel 126 into a single windrow, which is turned over by the wheel 126 so that the single windrow rests on ground raked by the rotary wheels 117.

It will be seen that in this form of the invention, the raking elements are positioned and spaced from each other in such a manner that the material or hay in front of each raking element is conveyed laterally into the path of movement of a rear raking element to form a single windrow by the cooperating raking elements in echelon arrangement, and the separately formed windrows are finally acted on by the raking wheel 126 so as to insure a clean and complete pickup by the harvesting machine. Manifestly, one or more turning wheels 126 can be associated with the machine, and the opposed echelons can be offset and adjusted to any desired position.

In the modified form of the invention shown in Figure 14, a centrally disposed elongated supporting frame 128 is arranged to be detachably connected to a suitable machine, such as a tractor or the like, so as to be drawn along the ground. Extending from opposite sides of the frame 128 adjacent the forward end thereof are a pair of rearwardly inclined arms 129, each of which is bent at its forward end, as at 130, to extend into an inclined opening 131 and be rotatably mounted in a bearing or sleeve 132 positioned in said opening so as to permit swinging or floating movement of the arm relative to the frame. The opposite end of each of the arms 129 is bent inwardly to provide an axle 133 for rotatably receiving the hub 134 of the raking wheels or the like 135 that may be substantially similar in construction and operation to the wheel or disc 117 previously described. The wheels 135 are detachably mounted on each of the axles 133 by the spaced locking collars 136. The arms 129 extend outwardly and rearwardly from the center beam member 128 so that in operation, as the fingers or tines 137 of the raking wheels engage the ground or windrow, they cause the material to be fed outwardly from the beam 128. Positioned to the rear of the arms 129 and extending from opposite sides of the beam 128, are a pair of complementary arms 138 which are shorter than the arms 129. Each of the arms 138 is bent at its forward end to provide an end portion 139 that extends through an inclined opening 140 in which is mounted a bearing sleeve 141 for revolubly receiving the end portion 139 so that the arm 138 can be swung or moved in a vertical plane relative to the frame 128. The outer end of each of the arms 138 is bent inwardly to provide an axle 142 on which is rotated a raking wheel or the like 143 preferably similar in size and construction to the wheel 137, and which is provided with the fingers or tines 144. The wheel 143 is detachably connected to the axle 142 by the spaced locking collars 145 and the set screws 146. The raking means or wheels 143 are shown positioned closer to the frame 128 than the wheels 135, and are laterally offset or in echelon arrangement relative to the forward movement of the machine. As shown, the arms or members 129 carry the forward raking wheels 135 and the shafts 138, the rear raking wheels 143. This arrangement can be reversed and the raking means or elements located in any desired offset position relative to each other. The wheels 137 and 143 are in such echelon arrangement and so spaced from each other, that the material is separately collected into windrows by each raking wheel and is not conveyed laterally into the path of movement of an adjacent rear wheel but operates to form separate piles or windrows similar to the raking arrangement shown in Figure 12. The long arms 129 are interchangeable with the short arms 138 to convert the machine from tedding to windrowing, and the wheels can be detachably connected to the frame 128 in any desired adjustable position as particular operating conditions may require. The mobile frame 128 is supported at its outer end by a transverse shaft 147 connected, as at 148, thereto. To the ends of the shaft are connected the ground-engaging wheels 149 in any suitable manner.

The length of the rods or arms 129 or 138 are axially adjustable by forming each of these rods into two telescopic sections, such as shown in Figure 15 in which the rod is provided with a tubular portion 150 into which extends an adjustable portion 151 that is bent, as at 152, to form an axle for supporting one of the rotary raking elements. The rod 151 may be maintained in any fixed adjusted position relative to the arm 150 by the set screws 153.

While for the purpose of illustration, the raking elements or wheels are shown disposed in echelon on opposite sides of the supporting frame, it will be manifest that one or more of these raking wheels can be provided and that they need not be arranged in transverse opposed pairs but can be positioned in any desired offset, angular or echelon arrangement relative to each other in rows or series and that any number of rotating elements can be associated with an agricultural machine for windrowing or tedding the material during the operation of the machine. It will be observed that in all forms of the invention, each of the rotary raking elements is provided with circumferentially disposed tines or fingers which have their outer free ends inclined rearwardly and in a direction opposite to the direction of rotation of the raking element, so that the tines of each wheel engage the material during the forward travel of the machine so as to be driven by the resistance at the lower periphery of the raking elements. Moreover, each of the rotary raking elements is connected to the frame in such a manner as individually and gravitationally to respond to changes of elevation or depression caused by the irregularities of the ground over which the wheels travel during the operation of the machine. It will be noted that the axis of rotation of each of the raking elements is individually supported from the ground and that the raking elements or wheels are angularly displaced relative to the frame and the forward direction of travel of the machine so that the material is conveyed laterally by the tines as they move in a path substantially parallel to the axis of rotation of the raking elements. Moreover, the axis of rotation of each of the raking elements is free to rise and fall to points above and below the frame. Since the raking elements are substantially the same size and shape and are detachable, interchangeable and reversible and as most of the other parts of the machine are likewise interchangeable or reversible, it will be seen that the machine lends itself to mass production by reason of the fact that the various parts can be economically reproduced in quantities and installed at minimum expenditure of time, labor and cost. It will further be noted that the adjustment of the raking elements, whether for windrowing or tedding, when arranged in an operational echelon, is such as to permit a line substantially parallel to the forward direction of travel of the machine to pass within the peripheral limits of the adjacent raking elements when they are associated for the purpose of collecting the material into a windrow or the like. Their lateral adjustment relative to each other is such that any forward raking element in a cooperating echelon discharges the material it is conveying within the diametrical limits and forward of its adjacent rearwardly disposed raking element and when arranged for tedding the raking elements discharge the material they are conveying within the diametrical limits and to the rear of their adjacent rearwardly disposed raking element. Moreover, the raking elements are angularly disposed with relation to the forward direction of travel of the machine and are interchanged or reversed so as to face either inwardly or outwardly or be placed inwardly or outwardly in relation to its rearwardly adjacent raking element depending upon whether the machine is used to convey the material laterally inwardly into a central windrow or outwardly relative to the machine into separate windrows or displace it in separate rows as in tedding. The distance between raking elements, front and rear, is controlled or adjusted by the repositioning of the raking elements on the elongated beam or frame. It will be observed that as the tines or fingers convey the material laterally that the fingers or tines are moved in a direction substantially parallel to their axis of rotation.

The term direction determining means as employed in the claims refers to any element such as the tongue 11 which compels the frame to follow the general path of travel of the draft vehicle and may also include other elements which limit the lateral divergency of the frame from such path, such as the ground wheels 18.

The described harvester was developed primarily for the harvesting of sweet potato vines, but it is thought that the principle of operation has other farm field uses such as in the windrowing of hay. Such a machine utilizing this principle of fingered wheels has the following advantages: (1) Each spoked wheel is independent and floating and accommodates itself to uneven land and (2) no complicated and expensive power drives are required.

Manifestly, the forms of the invention shown and described are merely illustrative of preferred embodiments and such changes may be made as fall within the purview of one skilled in the art without departing from the spirit of the invention and the scope of the claims.

I claim:

1. In a harvester of the class described, the combination of a frame having support members extending transversely thereof, spaced ground wheels connected to said members, said frame having transversely spaced arms pivoted thereon to form axles disposed at an angle to the forward direction of the harvester, raking wheels each including a hub revolubly mounted on said axles, each raking wheel including fingers extending radially outward, means concentric with each hub for maintaining the fingers in position, the finger of each raking wheel being arranged to engage the ground so that forward travel of the harvester rotates the raking wheels, and said fingers having their outer ends curved rearwardly from their direction of rotation so that the outer end of each finger engages the ground for a short distance and in a direction substantially parallel with the axle on which the raking wheel revolves so as to cause the fingers as they are rotated toward the ground to slide under the material and then shed the material adhering thereto after the fingers are moved away from the ground.

2. In a harvester, the combination of a longitudinally extending supporting beam having spaced transverse fixed members projecting outwardly from opposite sides thereof, support wheels connected to one of said members, each of said transverse members having a pair of rearwardly extending arms pivotally connected thereto, said arms being bent inwardly at an angle to the forward direction of movement of the harvester to form axles, concave spoked wheels revolubly mounted on the axles, each of the spoked wheels including a hub, an annular member spaced from the hub and having circumferentially disposed openings, said spokes being longitudinally curved to provide fingers extending radially outward from the hub and through said openings, the fingers of each concave wheel being arranged to engage the ground so that forward travel of the harvester rotates the concave wheels in a predetermined direction, and the outer ends of the fingers being curved rearwardly from their direction of rotation so that the outer end of each finger engages the ground for a short distance and in a direction substantially parallel with the axle on which the concave wheel revolves.

3. In combination with a harvester having spaced transverse aligned arms provided with inwardly extending portions constituting horizontal axles disposed at an angle oblique to the forward direction of the harvester, finger wheels, each of the wheels including a hub revolubly mounted on an axle and having circumferentially disposed openings, spoke fingers revolubly mounted in said openings and having laterally projecting lugs adjacent and above the hub, spaced collars fixed to each of said axles, one of said collars having a curved interrupted cam on the inner face thereof and arranged to be engaged by said lug during the rotation of the wheel, each of said fingers having its outer end normally curved rearwardly and arranged when the stud thereon moves past the interrupted cam to engage the collar and be rotated through substantially 90° to facilitate shedding of material from the fingers, the fingers of each concave wheel arranged to engage the ground so that forward travel of the harvester rotates the concave wheels in a predetermined direction, and said fingers having their outer ends curved rearwardly from their direction of rotation so that the outer end of each finger engages the ground for a short distance and in a direction substantially parallel with the axle on which the concave wheel revolves.

4. In combination with a harvester having a stub axle, a finger wheel having a hub revolubly mounted on the axle, said hub having circumferentially disposed openings, spoke fingers revolubly mounted in said openings, spaced collars fixed to said axle for maintaining the wheel on the axle, the fingers of each wheel arranged to engage the ground so that forward travel of the harvester rotates the wheel in a predetermined direction, said fingers having their outer ends curved rearwardly from their direction of rotation, and means on one of the collars and operatively associated with each of the spoke fingers for rotating the same at a predetermined point during the rotation of the wheel to facilitate shedding of the material from the fingers.

5. In a harvester of the class described, the combination of a supporting means comprising a frame, said frame having a plurality of arms individually pivotally connected thereto provided with outer free ends, said arms extending rearwardly from their pivots and being free to rise and fall with reference to the frame, the free end portion of each arm constituting an axle displaced at an angle to the frame and to the forward direction of travel of the frame and parallel to the axle portion of an adjacent arm, a tined raking wheel rotatably mounted on said axle, the tines of each wheel constituting fingers extending outwardly from its periphery, said periphery providing means for maintaining the fingers in position, the fingers of each wheel engaging the material on the ground, the resistance of said material rotating the raking wheels as the harvester travels forward, said fingers having their outer ends trailing rearwardly from the direction of rotation of the wheel, the outer end of each finger conveying the material laterally for a short distance in a direction substantially parallel with the axle on which the wheel revolves, said finger shedding the material adhering thereto as the fingers rise in their path of rotation, the axles of rotation of said wheels being individually supported by their respective wheels from the ground and free gravitationally to conform to irregularities in the terrain traversed, each axle being free to rise and fall to points above and below the frame, said wheels being arranged in echelon whereby a line substantially parallel to the forward direction of travel of the machine will pass within the peripheral limits of the adjacent cooperating wheels, said cooperating wheels being separately mounted in substantially erect and parallel planes so as to rise and fall in their respective planes.

6. In a rake of the type described, a mobile support having a predetermined line of movement, a rearwardly extending arm pivoted to said support about an axis extending transversely thereof, said arm having a terminal bearing extending rearwardly and at an acute angle to said first axis, and a raking wheel mounted on said bearing, said raking wheel including tines having their outer ends extending rearwardly with respect to the direction of rotation of the wheel and adapted to engage the forage on the terrain to thereby be rotated as said support moves along its line of movement.

7. In a rake of the type described, a mobile support having a predetermined line of movement, rearwardly extending arms pivoted to said support about an axis extending transversely thereof, said arms having each a terminal bearing extending rearwardly and at an acute angle to said first axis, and a raking wheel mounted on said bearing, each of said arms being provided with one of said raking wheels, said raking wheels being laterally displaced from each other to be supported in echelon formation, the lateral displacement of the wheels being less than the radius of the wheels.

8. A harvester comprising a frame, direction determining means connected to the frame whereby the frame has a predetermined line of movement, a plurality of tine provided raking wheels, a plurality of raking wheel journal axles, one for each raking wheel, and means interconnecting the frame and axles supporting said axles for independent pivotal movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels are disposed with their planes of rotation substantially vertical and parallel and at an oblique angle to said line of movement, the tines of said raking wheels being arranged to engage forage to rotate said raking wheels as said frame moves forwardly so that forage is raked forwardly and laterally of said line of movement of successive raking wheels.

9. In combination with a harvester having a stub axle, a finger wheel having a hub revolubly mounted on the axle, spoke fingers revolubly mounted on said hub, retainers on said axle for maintaining the wheel on the axle, the fingers of each wheel arranged to engage the ground so that forward travel of the harvester rotates the wheel, said fingers having their outer ends curved rearwardly from their direction of rotation, and means on one of said retainers and operatively associated with each of the spoke fingers for rotating the same at a predetermined point during the rotation of the wheel to facilitate shedding of the material from the fingers.

10. A harvester comprising a frame, means operatively associated with said frame to mount said frame for advance in a given direction at a generally constant elevation relative to the terrain, a plurality of rotary raking means arranged in generally erect parallel planes angularly disposed with respect to the normal direction of movement of said frame, mounting means pivotally borne by the frame and individually mounting each of said rotary raking means, the weight of said mounting means being supported partially by the pivotal connection and the remainder being supported entirely from the ground, each of said rotary raking means including outwardly extending fingers for engagement with forage on the terrain over which the frame is advanced, said fingers being adapted to rise and fall in response to depressions and elevations of the terrain, each of said rotary raking means being mounted freely to rotate by the resistance applied to said fingers by forage, said rotary raking means being displaced from each other both laterally and longitudinally with respect to the direction of advance of the frame to thereby be arranged in echelon formation, said fingers having each a portion inclined oppositely to the direction of rotation of said rotary raking means so that when a finger is at the point of rotation at which the finger most closely approaches the terrain, the inclined portion of the finger lies in an erect plane extending diagonally with respect to the advancing movement of the frame.

11. In combination with a harvester, a frame, spaced aligned arms provided with portions constituting axles disposed diagonally to the forward direction of the harvester, wheels revolvably mounted on the axles, each of the wheels including a hub, a member concentric with the hub, fingers fastened to said member, the fingers of each wheel being arranged to engage the ground so that forward travel of the harvester rotates the wheels, and said fingers having their outer ends extending rearwardly from their direction of rotation so that the outer end of each finger engages the ground for a short distance and in a direction substantially parallel with the axle on which the wheel revolves, said arms being independently connected to said frame to rise and fall independently of each other, said arms and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons.

12. In combination with a harvester, a frame, spaced aligned arms provided with portions constituting axles disposed diagonally to the forward direction of the harvester, wheels revolvably mounted on the axles, each of the wheels including a hub, a member concentric with the hub, fingers fastened to said member, the fingers of each wheel being arranged to engage the ground so that forward travel of the harvester rotates the wheels, and said fingers having their outer ends extending rearwardly from their direction of rotation so that the outer end of each finger engages the ground for a short distance and in a direction substantially parallel with the axle on which the wheel revolves, said arms being independently connected to said frame to rise and fall independently of each other, said arms and wheels being disposed in two sets, each set having its wheels in echelon, the two sets being arranged for rearward divergence relative to the forward direction of the harvester.

13. A harvester comprising a frame, direction determining means carried by said frame forwardly of its midportion, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, the tines of said raking wheels being arranged to engage forage to rotate said raking wheels as said frame moves forward so that forage is raked forwardly and laterally of said line of movement by successive raking wheels, said axles and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons.

14. A harvester comprising a frame, direction determining means carried by said frame forwardly of its midportion, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, the tines of said raking wheels being arranged to engage forage to rotate said raking wheels as said frame moves forwardly so that forage is raked forwardly and laterally of said line of movement by successive raking wheels, said axles and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons, rotary raking means located rearwardly of said pass relative to the forward direction of the harvester.

15. A harvester comprising a frame, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, direction determining means carried by said frame wholly forwardly of the rearmost of said raking wheels, the tines of said raking wheels being arranged to engage forage to rotate said raking wheels as said frame moves forward so that forage is raked forwardly and laterally of said line of movement of successive raking wheels, said axles and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons.

16. A harvester comprising a frame, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, and direction determining means carried by said frame wholly forwardly of the rearmost of said raking wheels, the tines of said raking wheels being arranged to engage forage to rotate said raking wheels as said frame moves forwardly so that forage is raked forwardly and laterally of said line of movement of successive raking wheels, said axles and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons.

17. A harvester comprising a frame, means operatively associated with said frame to mount said frame for advance in a given direction at a generally constant elevation above the terrain, a plurality of rotary raking means arranged in generally erect parallel planes angularly disposed with respect to the normal direction of movement of said frame, means borne by the frame and individually mounting each of said rotary raking means, each of said rotary raking means including outwardly extending fingers for engagement with forage on the terrain over which the frame is advanced, said fingers being adapted to rise and fall in response to depressions and elevations of the terrain, each of said rotary raking means being mounted freely to rotate by the resistance applied to said fingers by forage, said rotary raking means being displaced from each other both laterally and longitudinally to thereby be arranged in echelon formation, said fingers having a portion inclined opopsitely to the direction of rotation of said rotary raking means so that when a finger is at the point of rotation at which the finger most closely approaches the terrain, the inclined portion of the finger lies in a vertical plane extending diagonal with respect to the advancing movement of the frame, said echelon formation consisting of two sets of rotary raking means rearwardly converegent relative to the direction of movement of the frame, the rearmost wheels of the sets being laterally spaced to provide a pass for the forage raked by the rotary raking means of both sets.

18. A harvester comprising a frame, means operatively associated with said frame to mount said frame for advance in a given direction at a generally constant elevation above the terrain, a plurality of rotary raking means arranged in generally erect parallel planes angularly disposed with respect to the normal direction of movement of said frame, means borne by the frame and individually mounting each of said rotary raking means, each of said rotary raking means including outwardly extending fingers for engagement with forage on the terrain over which the frame is advanced, said fingers being adapted to rise and fall in response to depressions and elevations of the terrain, each of said rotary raking means being mounted freely to rotate by the resistance applied to said fingers by forage, said rotary raking means being displaced from each other both laterally and longituinally to thereby be arranged in echelon formation, said fingers having a portion inclined oppositely to the direction of rotation of said rotary raking means so that when a finger is at the point of rotation at which the finger most closely approaches the terrain, the inclined portion of the finger lies in a vertical plane extending diagonal with respect to the advancing movement of the frame, said echelon formation consisting of two sets of rotary raking means rearwardly divergent relative to the direction of movement of the frame.

19. A harvester comprising a frame, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels are disposed with their planes of rotation substantially vertical and parallel and at an obtuse angle to said line of movement, direction determining means carried by said frame wholly forwardly of the rearmost of said raking wheels, the tines of said raking wheels being arranged to engage forage to rotate said raking wheels as said frame moves forwardly so that forage will be raked forwardly and laterally of said line of movement of successive raking wheels, said direction determining means comprising a connecting element carried by the frame and arranged to be connected to a prime mover and wherein said axle supporting means comprise arms each having a pivot on said frame, said arms each having a bearing at an angle relative to said pivot, each of said wheels being journaled on one of said bearings.

20. The combination of claim 8 wherein said wheels comprise the sole means for effecting the vertical movement of the axles in accordance with the contour of the terrain over which the wheels pass.

21. A harvester comprising a frame, means operatively associated with said frame to mount said frame for advance in a given direction at a generally constant elevation above the terrain, a plurality of rotary raking means arranged in generally erect parallel planes angularly disposed with respect to the normal direction of movement of said frame, means borne by the frame and individually mounting each of said rotary raking means, each of said rotary raking means including outwardly extending fingers for engagement with forage on the terrain over which the frame is advanced, said fingers being adapted to rise and fall in response to depressions and elevations of the terrain, each of said rotary raking means being mounted freely to rotate by the resistance applied to said fingers by forage, said rotary raking means being displaced from each other both laterally and longitudinally to thereby be arranged in echelon formation, said fingers having a portion inclined oppositely to the direction of rotation of said rotary raking means so that when a finger is at the point of rotation at which the finger most closely approaches the terrain, the inclined portion of the finger will lie in a vertical plane extending diagonal with respect to the advancing movement of the frame, said means borne by the frame including arms each having a pivot on said frame and each having a bearing at an acute relation to said pivot, each of the rotary raking means being journaled on one of said bearings.

22. A harvester comprising a frame, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, direction determining means carried by said frame wholly forwardly of the rearmost of said raking wheels, the tines of said raking wheels being arranged to engage forage to rotate said raking wheels as said frame moves forward so that forage is raked forwardly and laterally of said line of movement of successive raking wheels, said axles and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons, raking means cooperating with said rearmost wheels and located rearwardly of said pass relative to the forward direction of the harvester.

23. In combination with a harvester, a frame, spaced aligned arms provided with portions constituting axles disposed diagonally to the forward direction of the harvester, wheels revolvably mounted on the axles, each of the wheels including a hub, a member concentric with the hub, fingers fastened to said member, the fingers of each wheel being arranged to engage the ground so that forward travel of the harvester rotates the wheels, and said fingers having their outer ends extending rearwardly from their direction of rotation so that the outer end of each finger engages the ground for a short distance and in a direction substantially parallel with the axle on which the wheel revolves, said arms being independently connected to said frame to rise and fall independently of each other, said arms and wheels being disposed in two sets, each set having its wheels in echelon, the two sets being arranged for rearward convergence relative to the forward direction of the harvester, the rearmost wheels of the echelons being laterally spaced to provide a pass for the forage raked by both echelons, raking means cooperating with said rearmost wheels and located rearwardly of said pass relative to the forward direction of the harvester.

24. A harvester comprising a frame, means operatively associated with said frame to mount said frame for advance in a given direction at a generally constant elevation above the terrain, a plurality of rotary raking means arranged in generally erect parallel planes angularly disposed with respect to the normal direction of movement of said frame, means borne by the frame and individually mounting each of said rotary raking means, each of said rotary raking means including outwardly extending fingers for engagement with forage on the terrain over which the frame is advanced, said fingers being adapted to rise and fall in response to depressions and elevations of the terrain, each of said rotary raking means being mounted freely to rotate by the resistance applied to said fingers by forage, said rotary raking means being displaced from each other both laterally and longitudinally to thereby be arranged in echelon formation, said fingers having a portion inclined oppositely to the direction of rotation of said rotary raking means so that when a finger is at the point of rotation at which the finger most closely approaches the terrain, the inclined portion of the finger lies in a vertical plane extending diagonally with respect to the advancing movement of the frame, said echelon formation consisting of two sets of rotary raking means rearwardly convergent relative to the direction of movement of the frame, the rearmost wheels of the sets being laterally spaced to provide a pass for the forage raked by the rotary raking means of both sets, additional raking means cooperating with said rearmost wheels and located rearwardly of said pass relative to the direction of movement of said frame.

25. A harvester comprising a frame, a plurality of tine provided raking wheels, a plurality of raking wheel journal axles, one for each raking wheel, means to support said axles for independent vertical movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels are disposed with their planes of rotation substantially vertical and parallel and at an obtuse angle to said line of movement, direction determining means carried by said frame wholly forwardly of the rearmost of said raking wheels, the tines of said raking wheels being arranged to engage forage to rotate said raking wheels as said frame moves forwardly so that forage is raked forwardly and laterally of said line of movement of successive raking wheels, said axles and wheels being disposed in two sets, each set having its wheels in echelon, the two sets being arranged for rearward divergence relative to the forward direction of the harvester.

26. A harvester comprising a mobile frame having means for connection to a prime mover, said means being adapted to impose weight of the frame on such prime mover, a plurality of raking wheels having tines outwardly extended therefrom for engagement with rakable material disposed on the ground, and means borne by the frame mounting the raking wheels and including wheel journal axles individual to the raking wheels having their respective raking wheels mounted for free rotation thereon, said axles being substantially horizontal and parallel and being oblique to the line of movement of the frame, said axles and raking wheels being laterally displaced from each other with respect to said line of movement and one thereof being rearwardly of the other.

27. A harvester comprising a mobile frame, means connected to the frame supporting the frame at three triangularly related positions at a substantially constant attitude relative to ground traversed, said means being adapted to control the line of travel of the frame and including means for connecting the frame to a prime mover whereby ground traversing movement is imparted thereto, transversely spaced arms pivotally mounted in the frame and forming axles disposed obliquely to the line of travel of the frame, and raking wheels each including a hub revolubly mounted on said axles and having fingers outwardly extended to engage the ground so that forward travel of the harvester rotates the raking wheels, said fingers having their outer ends curved rearwardly with respect to the direction of rotation of their respective raking wheels so that the outer end of each finger engages the ground for a short distance and in a direction substantially parallel with the axle on which the raking wheel revolves so as to cause the fingers as they are rotated toward the ground to slide under the material and subsequently to shed the material as the fingers rotate away from the ground.

28. A harvester comprising a mobile frame, means connected to the frame supporting the frame for ground traversing movement along a line of travel in predetermined relation to the frame and including means for connecting the frame to a prime mover with the prime mover in supporting relation to the frame, a plurality of finger assemblies each including a plurality of fingers, and finger connecting and mounting means individual to the assemblies mounted in the frame and in turn interconnecting the fingers of each assembly for unitary circuitous travel in paths individual to the assemblies with fingers of each assembly engaged with the ground and rakable substance disposed thereon and by such engagement rotating their respective assemblies during ground traversing movement, said fingers being mounted by the connecting and mounting means with said paths located in planes individual to the assemblies, substantially erect, parallel, and oblique to the line of travel of the frame and for elevational accommodation of the fingers substantially in the planes of their respective assemblies to elevations and depressions in the ground traversed, the oblique disposition of the planes of the assemblies with their fingers in ground engagement during ground traversing movement imposing a lateral thrust on the frame and said frame supporting means including means resisting said lateral thrust.

29. In a harvester, a raking wheel disposed obliquely to the line of travel of the harvester in a substantially erect plane and rotated by engagement with rakable substance on the ground comprising a hub, elongated fingers mounted in the hub and outwardly extended therefrom, and annular means spaced from the hub in substantially concentric relation thereto mounted on the fingers in position controlling relation thereto, each of said fingers having an arcuate outer end portion, said outer end portions of the fingers curving in a common direction circumferentially of the wheel and being adapted to slide under and to lift rakable substance disposed on the ground with a minimum of disturbance of the ground.

30. The combination of claim 8 wherein said direction determining means comprises a connecting element carried by the frame in a supporting relation thereto and arranged to be connected to a prime mover.

31. The combination of claim 8 including means to support the frame at three points, the supporting means at one of said points comprising said direction determining means and including a connecting element carried by the frame in a supporting relation thereto and arranged to be connected to a prime mover.

32. The combination of claim 8 wherein each of said raking wheels includes spokes extending in a direction that is outwardly from said axles, said tines comprising extensions of said spokes.

33. In a harvester, the combination of a frame, spaced aligned arms provided with portions constituting axles disposed diagonally to the forward direction of the harvester, raking wheels revolubly mounted on the axles, each raking wheel including a hub revolvably mounted on one of said axles, outwardly extended raking fingers, a finger spacing annular member concentric with the hub for maintaining the fingers in position and having spaced peripheral openings through which the fingers pass, the fingers of each wheel being arranged to engage the ground so that forward travel of the harvester rotates the wheels, and said fingers having their outer ends extending rearwardly from their direction of rotation so that the outer end of each finger engages the ground for a short distance and in a direction substantially parallel with the axle on which the wheel revolves, said arms being independently connected to said frame to rise and fall independently of each other.

34. A harvester comprising a frame, direction determining means connected to the frame whereby the frame has a predetermined line of movement, said direction determining means including a connecting element adapted for connection to a prime mover and a ground-engaging support wheel mounted in predetermined relation to the frame in spaced relation to the connecting element, a plurality of tine providing raking wheels, a plurality of raking wheel journal axles, one for each raking wheel, and means interconnecting the frame and axles supporting said axles for independent pivotal movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels are disposed with their planes of rotation substantially vertical and parallel and at an oblique angle to said line of movement, the tines of said raking wheels being arranged to engage forage to rotate said raking wheels as said frame moves forwardly so that forage is raked forwardly and laterally of said line of movement of successive raking wheels.

35. A harvester comprising a frame, direction determining means including a pair of ground engaging wheels, one spaced laterally on each side of said frame, each of said wheels being journaled with respect to said frame, a plurality of tine provided raking wheels, a plurality of raking wheel journal axles, one for each raking wheel, means to support said axles for independent elevational movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels will be disposed with their planes of rotation substantially vertical and parallel and at an obtuse angle to said line of movement, the tines of said raking wheels being arranged to engage forage to rotate said raking wheels as said frame moves forward so that forage will be raked forwardly and laterally of said line of movement by successive raking wheels, said direction determining means being carried by the frame wholly forwardly of the rearmost of said raking wheels.

36. A harvester comprising a mobile frame having means for connection to a prime mover, said means being adapted to impose weight of the frame on such prime mover, a plurality of raking wheels having tines outwardly extended therefrom for engagement with rakable material disposed on the ground, and means borne by the frame mounting the raking wheels and including wheel journal axles individual to the raking wheels having their respective raking wheels mounted for free rotation thereon, said axles being substantially horizontal and parallel and being oblique to the line of movement of the frame, said axles and raking wheels being laterally displaced from each other with respect to said line of movement and one thereof being rearwardly of the other, said tines being adapted to rise and to fall in response to depressions and elevations of the ground traversed and having outer portions extended outwardly and oppositely to the direction of rotation of said raking wheels during earth traversing movement.

37. A harvester comprising a mobile frame having means for connection to a prime mover, said means being adapted to impose weight of the frame on such prime mover; a plurality of raking wheels each having a central rotatable element, elongated fingers mounted on said element and extended outwardly therefrom, and means supported from the rotatable element engaging the fingers in position controlling relation thereto at locations substantially concentric to said element, the fingers having portions outwardly of the positioning means of substantially common configuration providing outer end sections extended both outwardly and in a common direction circumferentially of the wheel; and means borne by the frame mounting the raking wheels and including wheel journal axles individual to the raking wheels having their respective raking wheels mounted for free rotation thereon, said axles being substantially horizontal and parallel and being oblique to the line of movement of the frame, said axles and raking wheels being laterally displaced from each other with respect to said line of movement and one thereof being rearwardly of the other.

38. The combination of claim 33 wherein said alignment of arms is such as to cause the wheels to transmit the material handled by the harvester successively from the foremost to the rearmost arm and in a generally straight line forwardly and laterally with respect to the forward direction of the harvester.

39. The combination of claim 33 wherein said alignment of arms is such as to cause the wheels to transmit the material handled by the harvester successively from a foremost to a rearmost arm and in a generally straight line forwardly and laterally with respect to the forward direction of the harvester, wherein each of said wheels includes spokes extending in a direction that is outwardly from said hub, said fingers comprising extensions of said spokes, whereby as the fingers rotate toward the ground they slide under the material and then shed the material adhering thereto after the fingers are removed from contact with the ground.

40. The combination of claim 33 wherein said wheels comprise the sole means for effecting the rising and falling of said arms in accordance with the contour of the terrain over which the wheels pass.

41. The combination of claim 36 wherein said raking means include a wheel having a hub, the spokes of the wheel constituting fingers extending radially outwardly from the hub, said fingers being arranged to engage the ground without substantial penetration of the surface so that forward travel of the machine rotates the wheel, and said fingers having their outer ends curved rearwardly so that the outer end of each finger engages the ground for a short distance and in a direction substantially parallel with the axis about which the wheel revolves so as to cause the fingers, as they are rotated toward the ground, to slide under the material and then shed the material adhering thereto after the fingers are removed from the ground.

42. A harvester having a longitudinal axis and providing in combination, spaced floating spoked finger wheels disposed at an angle to said longitudinal axis of the harvester in crop engagement whereby the finger wheels are rotated during earth traversing movement of the harvester, each of said wheels including a hub having radial longitudinally curved fingers, and annular means spaced from the hub and contacting said fingers to maintain the latter in position, each of said fingers having its outer end portion extending rearwardly with respect to the direction of rotation of its wheel and shaped to slide under and lift the crop with a minimum of disturbance of the soil.

43. A harvester having a longitudinal axis and providing in combination, spaced floating spoked finger wheels disposed at an angle to said longitudinal axis of the harvester in crop engagement whereby the finger wheels are rotated during earth traversing movement of the harvester, each of said wheels including a hub having radial longitudinally curved fingers, and annular means spaced from the hub and contacting said fingers to maintain the latter in position, each of said fingers having its outer end portion extending rearwardly and shaped to slide under and lift the crop, the outer ends of the fingers of each wheel being disposed in a substantially common erect plane individual to their wheel, the curved fingers of each wheel being connected to their respective hub at points spaced longitudinally of the hub from the plane of the outer ends of the fingers to form a concave finger wheel.

44. A harvester comprising a mobile frame having means for connection to a prime mover, said means being adapted to impose weight of the frame on such prime mover; a plurality of raking wheels each having a central rotatable element, elongated fingers mounted on said element and extended outwardly therefrom, and means supported from the rotatable element engaging the fingers in position controlling relation thereto at locations substantially concentric to said element, the fingers having portions outwardly of the positioning means of substantially common configuration providing outer end sections extended both outwardly and in a common direction circumferentially of the wheel; and means borne by the frame mounting the raking wheels and including wheel journal axles individual to the raking wheels having their respective raking wheels mounted for free rotation thereon, said axles being substantially horizontal and parallel and being oblique to the line of movement of the frame, said axles and raking wheels being laterally displaced from each other with respect to said line of movement and one thereof being rearwardly of the other, and said outer end sections being extended forwardly with respect to the direction of movement of the frame.

45. An agricultural machine of the class described including a mobile frame having a longitudinal axis of movement, a plurality of substantially erect, parallel rotatable raking means mounted on said frame for independent rotational movement in echelon arrangement and disposed at an angle to the axis of movement of the frame whereby each raking means engages and is rotated by rakable crops disposed on the ground during movement of the frame and rakes said crops laterally with respect to the axis of movement, the raking means being spaced longitudinally of the axis of movement to provide raking means rearwardly of relatively forward associated raking means, the rearward raking means being spaced laterally of the axis of movement from the forward raking means in the direction opposite to that in which the raking means laterally rake crops thereby to displace said crops onto area previously raked by said forward raking means.

46. A harvester comprising a frame, direction determining means connected to the frame whereby the frame has a predetermined line of movement, a plurality of tine provided raking wheels, a plurality of raking wheel journal axles, one for each raking wheel, and means interconnecting the frame and axles supporting said axles for independent pivotal movement with respect to said frame so that each of said raking wheels may rise and fall relative to said frame in accordance with the contour of the terrain over which said frame moves, said raking wheel axles being substantially horizontal and parallel and being laterally displaced with respect to the line of movement of said frame and each other so that the raking wheels are disposed with their planes of rotation substantially vertical and parallel and at an oblique angle to said line of movement, the tines of said raking wheels being arranged to engage forage to rotate said raking wheels as said frame moves forwardly so that forage is raked forwardly and laterally of said line of movement of successive raking wheels, said tines having outer end portions extended outwardly with respect to the axles of their respective raking wheels and rearwardly with respect to the direction of rotation of their said raking wheels.

47. A harvester comprising a mobile frame having means for connection to a prime mover, said means being adapted to impose weight of the frame on such prime mover, a plurality of raking wheels having tines outwardly extended therefrom for engagement with rakable material disposed on the ground, and means borne by the frame mounting the raking wheels and including wheel journal axles individual to the raking wheels having their respective raking wheels mounted for free rotation thereon, said axles being substantially horizontal and parallel and being oblique to the line of movement of the frame, said axles and raking wheels being laterally displaced from each other with respect to said line of movement and one thereof being rearwardly of the other, said tines having outer ends curved rearwardly with respect to the direction of rotation of their respective raking wheels and inner ends, said inner and outer ends being disposed in substantially parallel planes spaced axially of the tines' respective raking wheels.

48. In a harvester, the combination of a frame, support means connected to the frame and supporting the frame at three triangularly related positions for movement in a predetermined direction, said support means including means adapted for connection to a prime mover, transversely spaced substantially parallel axles mounted on the frame in substantially horizontal positions disposed at an angle to the line of movement of the harvester, and raking wheels each including a hub revolvably mounted on said axles, fingers extended outwardly of the hub, means substantially concentric to the hub for maintaining the fingers in position, the raking wheels being arranged to engage the ground in substantially erect positions so that forward travel of the harvester rotates the raking wheels, and said fingers having their outer ends curved rearwardly with respect to their direction of rotation so that the outer end of each finger engages the ground for a short distance and in a direction substantially parallel with the axle on which the raking wheel revolves so as to cause the fingers as they are rotated toward the ground to slide under rakable material disposed on the ground and then to shed the material adhering thereto after the fingers are moved away from the ground, said fingers when in earth engagement being disposed in substantially erect planes oblique to the line of movement of the harvester.

49. In a rake of the type described, a mobile support having a predetermined line of movement, an elongated arm having an end pivotally mounted in the support and an extended end spaced longitudinally of said line of movement from the mounted end providing a terminal stub bearing oblique to said line of movement, and a raking wheel mounted on said bearing obliquely to said line of movement, said raking wheel including tines having their outer ends extending rearwardly with respect to the direction of rotation of the wheel and adapted to engage forage on the terrain thereby to be rotated as said support moves along its line of movement, said tines when in earth engagement being disposed in substantially erect planes oblique to said line of movement.

50. In a rake of the type described, a mobile support having a predetermined line of movement, a plurality of elongated arms pivotally mounted in the support and providing extended ends spaced longitudinally of said line of movement from their respective pivotal mountings and providing terminal bearings oblique to said line of movement, and raking wheels individually rotatably mounted on said bearings oblique to said line of movement so that said raking wheels may rise and fall relative to the support in accordance with the contour of the terrain over which the support moves, said raking wheels including tines having their outer ends extending rearwardly with respect to the direction of rotation of the wheels and adapted to engage forage on the terrain thereby to be rotated as said support moves along its line of movement, said raking wheels comprising the sole means for effecting the rising and falling of the arms in accordance with the contour of the terrain over which the wheels pass.

51. In a rake of the type described, a mobile support, direction determining means connected to said support and predetermining a line of movement for the frame, a plurality of elongated arms pivotally mounted in the support and providing extended ends spaced longitudinally of said line of movement from their respective pivotal mountings and providing terminal bearings oblique to said line of movement, and raking wheels individually rotatably mounted on said bearings oblique to said line of movement so that said raking wheels may rise and fall relative to the support in accordance with the contour of the terrain over which the support moves, said raking wheels including tines having their outer ends extending rearwardly with respect to the direction of rotation of the wheels and adapted to engage forage on the terrain thereby to be rotated as said support moves along its line of movement, said raking wheels comprising the sole means for effecting the rising and falling of the arms in accordance with the contour of the terrain over which the wheels pass, there being a raking wheel wholly rearwardly of said direction determining means.

52. In a rake of the type described, a mobile support, direction determining means connected to said support whereby the support has a line of movement in predetermined relation thereto, arms pivotally mounted in said support about individual axes transversely disposed to the direction of movement of the support, said arms each having a terminal bearing extending therefrom in spaced relation to its pivot axes longitudinally of the support and extended therefrom obliquely to the line of movement, and raking wheels individually mounted on said bearings, said raking wheels being laterally displaced from each other in echelon formation and the lateral displacement of the wheels being less than the radius of the wheels, the direction determining means being carried by the support forwardly of the rearmost of said raking wheels.

53. In a harvester, a raking wheel disposed obliquely to the line of travel of the harvester in a substantially erect plane and rotated by engagement with rakable substance on the ground, comprising a central rotatable element adapted for mounting on a journal, elongated fingers mounted on said element and extended outwardly therefrom, and means supported from the rotatable element engaging the fingers in position controlling relation thereto at locations substantially concentric to said element, the fingers having portions outwardly of the positioning means of substantially common configuration providing outer end sections extended both outwardly and in a common direction circumferentially of the wheel adapted to slide under and to lift rakable substance disposed on the ground.

54. A forage apparatus comprising a mobile frame, means supporting the frame for earth traversing movement in a predetermined direction in relation thereto at a substantially constant attitude relative to ground traversed, a plurality of rotary raking wheels having peripherally extended forage engaging tines, a bearing journaled in each wheel having an arm integral therewith extended substantially radially of its respective wheel providing an extended mounting end portion, and a plurality of substantially parallel mounting means integral with the frame mounting the mounting end portions of the arms for independent pivotal movement about substantially horizontal axes with their respective raking wheels disposed in substantially erect planes oblique to said predetermined direction of earth traversing movement with the tines in engagement with forage on the ground whereby the raking wheels are rotated during earth traversing movement, said mounting means mounting the arms with their raking wheels in echelon arrangement and spaced transversely of the frame so that relatively rearward raking wheels displace forage laterally onto area previously raked by the next forwardly adjacent raking wheels, the fingers having outer ends curved rearwardly with respect to the direction of rotation of their respective raking wheels so that the outer end of each finger engages the ground for a short distance and in a direction substantially parallel with the axle on which its raking wheel is mounted so as to cause the fingers as they are rotated toward the ground to slide under the forage and subsequently to shed the forage as the fingers rotate away from the ground, the fingers being disposed in substantially erect planes oblique to said direction of earth traversing movement.

55. A harvester for raking cut crops into a windrow comprising a plurality of finger wheels each comprising a hub, spoke elements carried by the hub and extending generally radially outwardly to a first circumferential plane concentric with the hub, teeth elements extending generally radially outwardly from said circumferential plane and ending in a second circumferential plane concentric with the first, confining means engaging said spoke elements and said teeth elements along said first circumferential plane and holding them in circumferentially spaced relationship, axles mounting said hubs, there being one axle for each hub, and said finger wheels being freely rotatable on said axles, an axle supporting frame element, said axles being supported by said frame element in spaced parallel relation substantially horizontal, oblique to the line of travel of the frame element, and offset one from another with respect to the line of travel of the harvester whereby the finger wheels are disposed in generally parallel arrangement oblique to the line of travel and spaced apart laterally and longitudinally with respect to said line, and said wheels being rotatable by engagement of the teeth thereof with cut crops, and means connected to the frame element adapted to couple the frame element with a prime mover and to transfer at least a part of the weight of the frame element to the prime mover.

References Cited in the file of this patent
UNITED STATES PATENTS
2,472,260    Morrill _____ June 7, 1949

OTHER REFERENCES
Public Use Proceeding Decision No. 13/56; vol. 89; page 502 (December 17, 1957).